Nov. 9, 1971          G. LESEMANN          3,618,368
METHOD AND INSTRUMENT FOR DETERMINING THE MOISTURE
CONTENT AND/OR TEMPERATURE OF MOVING MATERIAL
Filed Sept. 3, 1969                          2 Sheets-Sheet 1
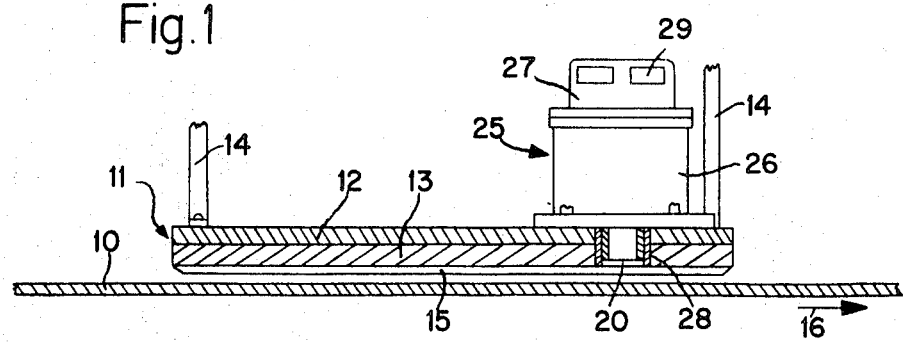
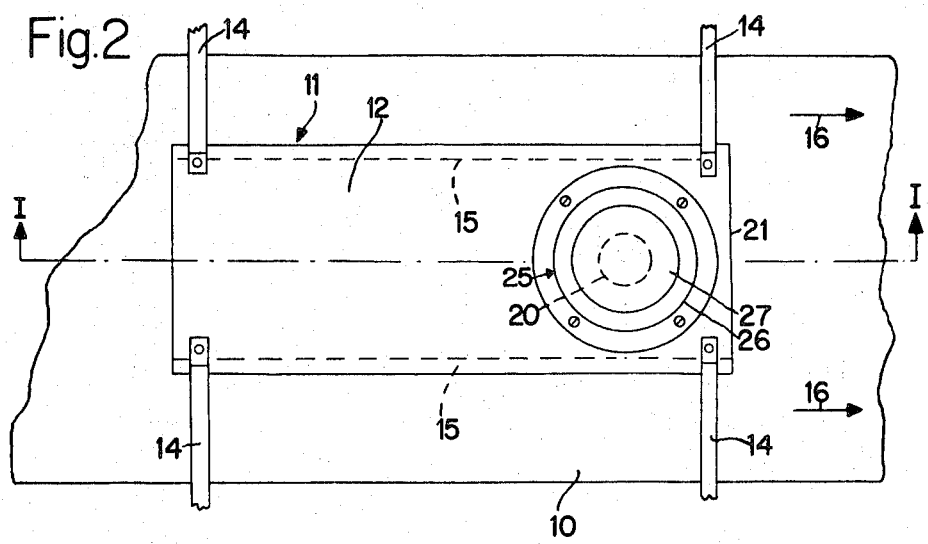
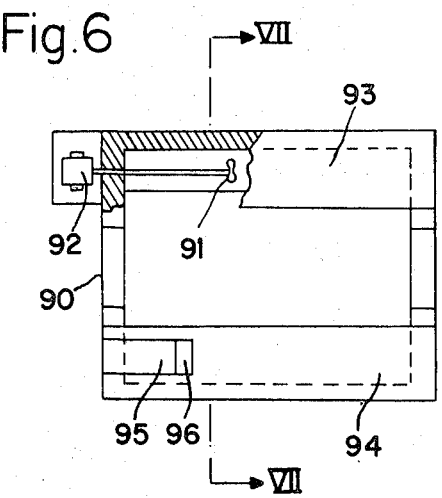
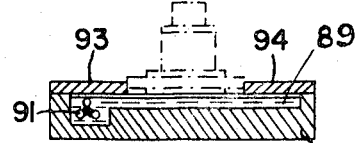
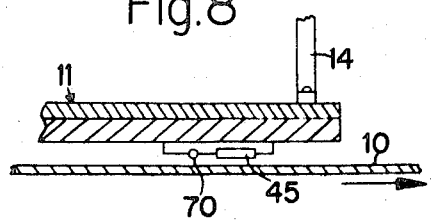
INVENTOR.
GERHARD LESEMANN
BY
Woodhams, Blanchard & Flynn
ATTORNEYS

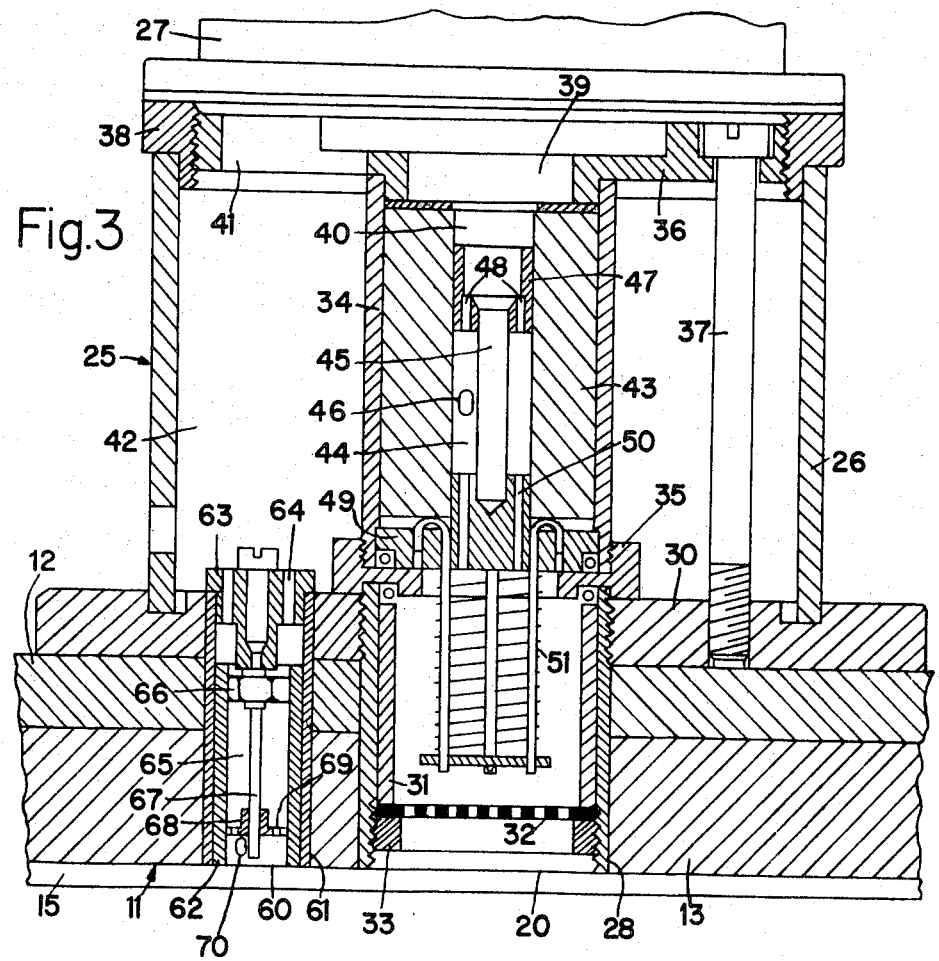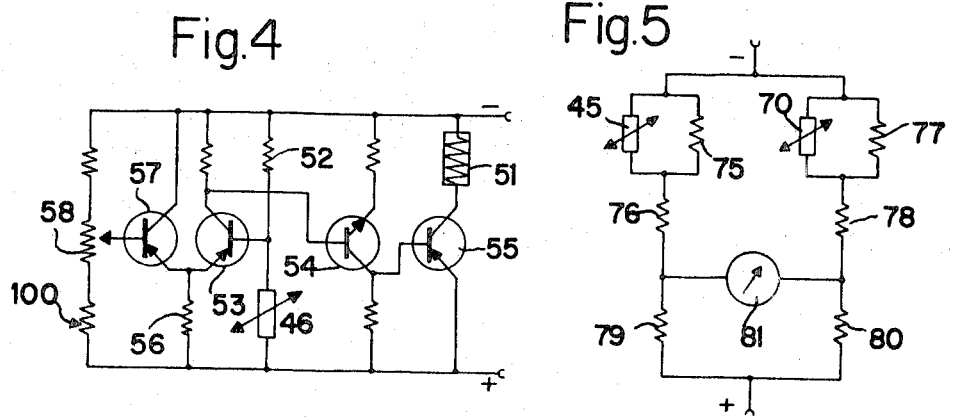

United States Patent Office 3,618,368
Patented Nov. 9, 1971

3,618,368
METHOD AND INSTRUMENT FOR DETERMINING THE MOISTURE CONTENT AND/OR TEMPERATURE OF MOVING MATERIAL
Gerhard Lesemann, Hannover, Germany, assignor to Sina AG fur Instrumentierung und Automatik, Zurich, Switzerland
Filed Sept. 3, 1969, Ser. No. 854,938
Claims priority, application Switzerland, Sept. 6, 1968, 13,427/68
Int. Cl. G01n 25/64
U.S. Cl. 73—73
16 Claims

ABSTRACT OF THE DISCLOSURE

A method and apparatus for measuring the moisture content of a moving material by using a moisture sensing device which supplies an electrical output signal as a function of the value of the moisture being determined. A cover of non-hydroscopic, thermally insulating material is fixedly disposed so as to be slightly spaced from the surface of the moving material. The cover is provided with means for causing the atmosphere passing between the cover and the surface of the material to be drawn off and moved past, and into contact with, the moisture sensing device. The atmosphere, before being moved past the moisture sensing device, is first brought into contact with a temperature varying device for permitting the temperature of the atmosphere to be selectively varied.

---

This invention relates to a method of and an instrument for determining the moisture content and/or temperature of moving material, e.g. a web of paper or a stream of loose material, by using at least one measuring instrument which supplies an electrical output signal as a function of the value of the parameter being determined.

Measuring the moisture content or temperature of a moving material has until now been in principle the same as carrying out static measurements on stationary articles, i.e. an armature containing a measuring instrument for moisture or temperature determination is brought into contact with the surface of the moving material. By the use of suitable means on the armature and on the measuring instrument, the inertia with which the measuring instrument reacts to alterations and the moisture content or temperature can be held within usable limits for most practical applications. In all cases, one endeavours to ensure that the moisture content or temperature in the immediate vicinity of the measuring instrument corresponds as far as possible with the moisture content or temperature at the surface of the material. If it is not permissible for the armature to come into contact with the moving material, whether it is because the material is sensitive to scratching (for example in the case of photographic sheets) or because through contact contamination of the armature or measuring instrument is possible and the accuracy of measurement could be seriously impaired, a certain distance must be maintained between the armature and the material. Such a spacing can, however, easily lead to a considerable difference between the value of the physical parameter, such as moisture content or temperature, as determined at the surface of the material and the value in the immediate vicinity of the measuring instrument. Consequently, the accuracy of measurement may be considerably reduced under certain circumstances.

It is an object of the present invention to overcome these disadvantages and to provide a method of and an instrument for determining the moisture content and/or temperature of a moving material with greater accuracy than has heretofore been possible.

In accordance with the method of the invention, a laminar cover of a non-hygroscopic, thermally insulating material is mounted in a fixed position spaced from the surface of the moving material and at least approximately parallel thereto, the linear surface measurements of the cover being each at least double the spacing of the cover from the surface of the material, and the atmosphere passing between the cover and the material is brought into contact with a measuring instrument.

The cover prevents the exchange of moisture and heat from the surface of the moving material into the free surroundings and causes a homogenisation of the atmosphere between the material and the cover. The gas molecules of the boundary layer atmosphere are constrained by the cover, remain longer adjacent to the surface of the material, and thereby have the opportunity of collecting the moisture and coming to the temperature of the surface of the material. Consequently, the atmosphere passing between the material and the cover is, with a comparatively small degree of error, representative of the moisture content and temperature of the surface of the moving material. The size of error diminishes with large surface dimensions of the cover. For a constant permissible degree of error, the larger the cover, the greater the distance at which it can be spaced from the material. The method of the present invention is not limited to flat surfaces for the material and the cover, but can also be used with curved surfaces, e.g. in the case of a web of material passing over a rotating cylinder.

The comparatively small spacing necessary between the cover and the surface of the moving material can be maintained by any type of mounting means, or alternatively by means of runners or rollers. It is also possible to maintain the cover at the desired distance above the surface of the material by means of an air cushion, the air required for producing the air cushion preferably being taken from the boundary layer adjacent to the surface of the material.

Preferably the atmosphere passing between the material and the cover can be artificially drawn off and moved past the measuring instrument. Suction can take place at a rate of for example 0.05 to 0.5 litres/second, according to the speed of movement of the material. If the measuring instrument is a hygrometer, the atmosphere which has been drawn off but not yet moved past the measuring instrument can be brought to a predetermined temperature which may be either constant or constitute a predetermined temperature differential with respect to the temperature of the material. In this way, the actual measurement of moisure content can be postponed to a range of temperature more favourable for accuracy, or an indication of the moisture content in respect of a specific temperature can immediately be obtained because the relationship between the temperature and moisture content is governed by known physical laws.

According to one embodiment of the invention, the measuring instrument is mounted actually in the intermediate space between the cover and the moving material.

For the calibration of the measuring instrument, the cover may be mounted spaced above the surface of a stationary control object having a known surface moisture content and/or surface temperature, and the atmosphere between the control object and the cover can be set in motion by means of a blower so as to be analogous to the speed and direction of movement of the material whose moisture content and temperature are to be determined. The distance between the control object and the cover is preferably adjusted so as to be identical to that between the cover and surface of the moving material. For the simultaneous calibration of both temperature and moisture measuring instruments, a bath having a saturated electrolyte solution or a sulphuric acid solution can be used as the control object.

The instrument provided according to the invention includes at least one measuring instrument which supplies an electrical output signal as a function of the value of the parameter being determined, and also comprises a plate-like cover of non-hygroscopic, thermally insulating material, means for mounting the cover in a fixed position spaced from the surface of the moving material whose moisture content and/or temperature is to be determined, and at least one chamber containing the measuring instrument and having an inlet orifice and a outlet orifice, the former being in communication with an aperture in the cover and the latter being connected to a suction device.

The suction device is preferably a blower which is combined with the chamber to form an integral unit. The chamber is mounted directly on the surface of the cover and can be mechanically connected thereto so that the unit is of compact construction.

If the measuring instrument in the chamber is a hygrometer, the inlet orifice of the chamber can be provided with an intake pipe which contains a heating and/or cooling device for the atmosphere drawn into the chamber. In this case, in addition to the hygrometer, the chamber also contains a thermometer which can be connected to control means for automatically regulating the heating and/or cooling device. Moreover, a second chamber may be provided which contains a thermometer in its inlet orifice, with the two chambers and the blower combined to form an integral structural unit. The hygrometer and thermometer can be connected into oppositely acting arms of an electrical bridge circuit, and display or recording apparatus can be connected across the differential output of the bridge circuit to indicate the moisture content of the material at a selected reference temperature.

The cover may be rectangular in shape with the longitudinal axis parallel to the direction of movement of the material. With such a cover it is preferable to locate the aperture through which the atmosphere is withdrawn at a position offset from the centre of the cover towards the trailing narrow edge of the cover, preferably so that the distance of the aperture from the trailing narrow edge of the cover is substantially the same as from each of the two longer sides of the cover.

In order that the invention may be fully understood, various embodiments of instrument according to the invention will now be described by way of example and with reference to the accompanying drawings, in which:

FIG. 1 is a schematic side elevation of a first, preferred embodiment of moisture and temperature measuring instrument according to the invention, with part of the figure comprising a vertical section taken along the line I—I of FIG. 2, and with the section line running parallel to the direction of travel of the moving material whose moisture content and temperature are to be determined;

FIG. 2 is a plan view of the instrument illustrated in FIG. 1;

FIG. 3 is a detailed vertical cross-sectional view on an enlarged scale of part of the instrument, and likewise taken along the line I—I of FIG. 2;

FIG. 4 shows an electrical circuit for a control device for automatically regulating a heating device which is to be found in that part of the moisture and temperature measuring instrument illustrated in FIG. 3;

FIG. 5 shows an electrical bridge circuit which, with due consideration for physical laws, couples the moisture value and the temperature value and delivers an electrical output signal which is a measure of the moisture content of the material at a selected reference temperature;

FIG. 6 shows, partly in plan and partly in horizontal cross-section, an auxiliary unit for calibrating the moisture and temperature measuring instrument of FIGS. 1 and 2 to a reduced scale;

FIG. 7 is a vertical cross-sectional view taken along the line VII—VII of FIG. 6 with the moisture and temperature measuring instrument indicated by chain-dotted lines; and, FIG. 8 is a longitudinal sectional view, similar to FIG. 1, of part of a second embodiment of moisture and temperature measuring instrument.

As shown in FIGS. 1 and 2, a plate-like cover indicated generally at 11 is mounted in a fixed position spaced above a sheet or web 10 travelling horizontally as indicated by the arrows 16. The cover 11 comprises a plate 12, for example of a polymeric plastics material, which serves as a base, and a lining 13 of non-hygroscopic material with high thermal insulation properties attached to the underside of the plate 12. The lining 13 preferably consists of a polymeric foam material having closed pores. The cover 11 is suspended above the web 10 by means of brackets 14 so that it hangs substantially parallel to the upper surface of the web. The lower surface of the cover 11 facing the web 10 is provided with two downwardly projecting runners 15 which ensure a minimum spacing between the upper surface of the web 10 and the lower surface of the cover 11 and thereby prevent the cover 11 from rubbing against the web 10 under certain circumstances. The web 10 may be for example a moving web of paper.

It can be seen from FIG. 2 that the cover 11 is rectangular in plan with its longer sides arranged parallel to the direction of movement 16 of the web 10. The length of the cover 11 is at least twice its width. In one embodiment tested in practice, the length of the cover 11 was about 50 cm. and the width about 20 cm. The distance between the upper surface of the web 10 and the lower surface of the cover 11 is in every case several times smaller, e.g. 5 to 100 times smaller, than the smallest linear surface dimension of the cover 11, i.e. the width of said rectangle. In practice, a spacing of 2 to 3 mm. has proved to be suitable. Consequently, the two runners 15 only project about 2 mm. below the bottom of the cover 11. The runners 15 are arranged to extend parallel to the direction of movement 16 of the web 10 along each of the longer edges of the cover 11, as seen in FIG. 2.

In a central portion of the cover 11 there is a hole 20 through which a part of the atmosphere passing between the web 10 and cover 11 is sucked. The hole 20 lies on the longitudinal centre-line of the cover 11 but towards the right-hand shorter side 21 of the rectangular cover as viewed in FIG. 2. The hole 20 is preferably about the same distance from the right-hand shorter side 21 of the cover as from each of the two longer sides thereof.

A unit 25 comprising a housing 26 and a blower 27 coupled to the housing is fixed directly to the cover 11 on the face thereof remote from the web 10. An intake pipe 28 secured to the housing 26 projects into the hole 20 in the cover 11. The atmosphere passing between the web 10 and the cover 11 is sucked through the intake pipe 28 into the housing 26 by the blower 27 and is then expelled through apertures 29 at the top of the blower into the open air. The internal construction of the unit 25 will now be described in detail with reference to FIG. 3.

The intake pipe 28 is screwed into a central threaded bore in a flanged base 30 of the housing 26, and is clad on its inside surface with a cylindrical lining 31 of non-hygroscopic, thermally insulating material. An air filter 32 is fitted at the inlet end of the intake pipe 28 and is secured in place by means of a threaded ring 33. The filter 32 can be removed and exchanged simply by releasing the threaded ring 33. If required, a number of similar or different filters 32 can be used together. The filter 32 is non-hygroscopic and thermally neutral. Above all, it has to retain any particles of dust or dirt. In certain cases, the filter 32, or one of the filters if several are used, can be formed as an absorption filter so that it absorbs chemically reactive materials and prevents them from passing further into the unit 25.

A pipe 34 is fitted inside the housing 26 so as to be coaxial with the intake pipe 28 and with its lower end screwed into an annular disc 35 which in turn is located on the upper end of the intake pipe 28. A cover plate 36 is supported on the upper end of the pipe 34 and is secured in position with the aid of screws 37, only one of which is visible in FIG. 3. The cover plate 36 is provided with a peripheral thread on which is screwed a ring 38 which on the one hand fits into the cylindrical upper end of the housing 26 and on the other hand supports the blower 27. A central hole 39 in the cover plate 36 connects the suction side of the blower 27 with the inner space 40 of the pipe 34, whilst a further, eccentrically positioned hole 41 in the cover plate 36 provides a connection between the suction side of the blower 27 and the annular space 42 externally surrounding the pipe 34.

The interior of the pipe 34 is lined with a comparatively thick layer 43 of non-hygroscopic, thermally insulating material which defines therein a chamber 44. The chamber 44 contains a humidity sensing element, such as a hygrometer 45. A temperature sensing element, such as a thermometer 46, is located within the layer 43 in communication with the chamber 44. The hygrometer 45 in known manner comprises an electrical resistance whose value depends on the relative humidity of the surrounding air. On the other hand, the thermometer 46 comprises an electrical resistance whose value depends on the prevailing temperature. The essentially cylindrical hygrometer 45 has its upper end held in a support member 47 which defines the top of the chamber 44 and has several air ducts 48 therethrough which connect the chamber 44 with the central hole 39 in the cover plate 36. The lower end of the hygrometer 45 is held in an insert 49 which defines the bottom of the chamber 44 and is fitted into the lower end of the pipe 34. The insert 49 has a series of air ducts 50 therethrough which provide a connection between the chamber 44 and the interior of the intake pipe 28. Furthermore, the insert 49 serves as a carrier for an electric heating device 51 which is located in the intake pipe 28.

The heating device 51 is automatically regulated by the thermometer 46 with the aid of a control device so that the temperature in the chamber 44 remains practically constant. This control device is illustrated in FIG. 4. The thermometer 46 and a fixed resistance 52 together form a voltage divider with the base of a transistor 53 connected to the junction therebetween. This transistor 53 forms the first stage of a D.C. amplifier which includes two further transistors 54 and 55, the latter having the electric heating device 51 directly connected in its collector circuit as the working resistance. The first transistor 53 and an additional transistor 57 have a common emitter resistance 56. In order to adjust the system of the desired value of constant temperature in the chamber 44, the electric potential at the base of said additional transistor 57 is selectively variable within certain limits with the aid of a manually adjustable potentiometer 58 for example.

In the embodiment of the device as illustrated in FIG. 3, the cover 11 has, in addition to the hole 20, a second hole 60 which is located closely adjacent to the first hole 20. A pipe 61 which is secured in a corresponding bore in the flanged base 30 of the housing 26 projects into this second hole 60. The inner surface of the pipe 61 is for the most part clad with a lining 62 of a thermally insulating material. A support pin 63 is fitted in the upper end of the pipe 61 and is formed with several ducts 64 therethrough which provide a connection between the abovementioned annular space 42 in the housing 26 and a chamber 65 within the pipe 61. A temperature-sensing needle 67 is attached by means of a nut 66 to the lower end of the support pin 63 projecting into the chamber 65. The lower end portion of the needle 67 is further held by a locating ring 68 which also has a number of ducts 69 therethrough. A thermometer of temperature sensing element 70, which comprises an electrical resistance with a resistance value dependent upon the ambient temperature, is mounted immediately adjacent to the temperature-sensing needle 67 in the air inlet of the pipe 61. The thermometer 70 serves to measure the temperature of the atmosphere drawn into the pipe 61. This temperature is for practical purposes that of the upper surface of the moving web 10.

FIG. 5 shows the manner in which the hygrometer 45 and the thermometer 70 are connected into an electrical bridge circuit. The two instruments 45 and 70 are connected in two effectively opposed arms of the bridge. The hygrometer 45 is connected in parallel with an ohmic resistance 75, and a further ohmic resistance 76 is connected in series with the parallel-connected pair. In a similar way, the resistance thermometer 70 is connected in parallel with an ohmic resistance 77, with a further ohmic resistance 78 connected in series with the parallel-connected pair. The resistances connected in series and in parallel with the measuring instruments 45 and 70 serve to compensate for influences on the two instruments in accordance with the physical laws governing the relationship between temperature and moisture content. The two remaining arms of the bridge each include an ohmic resistance 79, 80. A regulating, indicating or recording device 81 connected between the junction of resistances 76 and 79 and the junction of resistances 78 and 80 provides a differential output from the bridge circuit.

Using the device described above the moisture content and temperature of the moving web 10 can be determined by the following method.

The cover 11 is, as described above in connection with FIGS. 1 and 2, fixedly mounted at a comparatively small distance from the upper surface of the moving web 10. The blower 27 is started so that it sucks a comparatively small volume of air per unit time through the intake pipe 28 and pipe 61, e.g. 0.05 to 0.5 litre/second, and preferably about 0.1 litres/second.

Whereas at the uncovered parts of the web the temperature and moisture content tend more and more towards the values of the ambient air with increasing distance from the surface of the material, this is not the case in the space between the web 10 and the cover 11. The thin air layer passing therebetween assumes, with a negligible degree of error, the same temperature and the same moisture content as the upper surface of the moving web 10. A portion of this air is sucked into the pipes 28 and 61 by means of the blower 27 and is drawn past the hygrometer 45 and the thermometer 70.

It is first assumed that the heating device 51 is switched off. In this case, essentially the same temperature and the same moisture content exists both in the chamber 44 and in the boundary layer of air in the space between the moving web 10 and the cover 11. The temperature is detected by the thermometer 70 and the moisture content by the hygrometer 45. The two meters 45 and 70 could control separate electrical circuits with separate indicating or recording devices, so that the temperature and the equilibrium moisture content of the web material at that particular temperature could be continuously measured. However, in practice, it is frequently desired to know the moisture content of the material at a specific temperature which differs from the particular prevailing temperature of the material, e.g. the moisture content at 20° C. The desired information could be determined from the measured results of temperature and moisture content according to the known physical laws by means of graphs, calculations or tables, but these are all complicated and time-consuming. The device described above enables the desired information to be obtained easily and quickly.

For this purpose, the heating device 51 is switched on and is automatically controlled with the aid of the thermometer 46 and the control circuit according to FIG. 4 so that the atmosphere passing into the chamber 44 assumes a constant temperature which is higher than the temperature of the web 10, e.g. 60° C. In this case, the hygrometer 45 determines the moisture content prevailing at the elevated constant temperature while the thermometer 70 is responsive as before to the actual temperature of the web 10. The bridge circuit can now be constructed so that the reading from the instrument 81 directly represents the desired information concerning the moisture content of the web material at a predetermined temperature, e.g. 20° C.

It is also possible, and generally preferred in practice, to use the instrument 81 only for an indication that the bridge is in balance, and to adjust at least one of the resistances 79 and 80 to bring about a state of balance. This can be carried out automatically in known manner. The change in the resistances 79 and 80 necessary for producing a balanced condition is then a measure of the moisture content of the material at the predetermined temperature.

If the instrument 81 is itself a regulating instrument, the bridge circuit of FIG. 5 can also be used to automatically adjust the moisture content of the moving web 10 to a prescribed ideal value in respect of a predetermined temperature. This can be effected for example by controlling a drying plant for the web material by means of the regulator 81 in dependence on the degree of imbalance of the bridge circuit in one sense or the other.

In a modified system, the thermometer 46 can be located in the bridge circuit of FIG. 5 in place of the hygrometer 45 so that the two thermometers 46 and 70 are connected in oppositely acting bridge arms. The resistances connected in series and in parallel with the thermometers 46 and 70 serve to compensate for external influences on the two thermometers in the appropriate proportions. The instrument 81 connected across the differential output of the bridge circuit is a regulator for controlling the heating device 51. In this embodiment, the temperature in the chamber 44 is automatically regulated so that automatic balance of the bridge circuit is achieved. An electric indicating instrument connected to the hygrometer 45 then indicates the moisture value, this being related either to the temperature recorded by the thermometer 70 or to another temperature proportional thereto depending upon the ratio of the fixed resistances 79 and 80 of the bridge circuit one to the other.

To calibrate and control the device described above, an auxiliary device can be used of the form shown in FIGS. 6 and 7. This auxiliary device comprises a flat tray 90 which contains a bath 89 of a saturated salt solution or sulphuric acid which takes the place of the web 10.

A stirrer 91 which is incorporated in the tray 90 is driven by a small motor 92 located outside the tray and continually ensures a favourable and regular mixing of the solution 89. The tray 90 is provided at the top with two cover plates 93 and 94 which leave a space between them which corresponds to the width of the cover 11 of the moisture and temperature measuring device. The length of the cover plates 93 and 94 and of the tray 90 is approximately the same as that of the cover 11. A thermometer 96 for measuring the temperature of the bath and a hygrometer 95 suitable for the static measurement of moisture content are mounted abive a cut-out in one of the cover plates 94.

The cover 11 is placed on the tray 90 between the two cover plates 93 and 94, as illustrated in FIG. 7 by chain-dotted lines. The distance between the lower face of the cover 11 and the level of the solution 89 in the tray is arranged to be equal to the distance between the cover 11 and the upper surface of the moving web 10 when the moisture and temperature measuring device is being used with the web. The blower 27 is then set in operation so that it produces the same rate of air flow as during measurement with the moving web 10. A static calibration or control of the whole measuring device can now be carried out by comparing the measured values with the readings on the instruments 95 and 96. The effect of the finite dimensions of the cover 11 on the measured results which are obtained can be ascertained by removing or adding to the cover plates 93 and 94.

An imitation of the movement of the web 10 can be achieved to a close approximation by creating a corresponding movement of air between the cover 11 and the surface of the liquid 89. The same maximum flow velocity can thereby be produced under the cover as is produced by movement of the web 10. This air current can be created by means of a separate blower which is located externally of the tray 90. Alternatively, the blower 27 can be used to produce the desired air current. For this, the cover 11 is sealed against the walls of the tray 90 so that air can only be drawn into the space between the cover and the liquid from the leading narrow side, i.e. from the left in FIGS. 1 and 2. The rate of air flow through the blower 27 is increased so that the desired current is produced beneath the cover 11. A rate of air flow of about 2 litres/second has been found to be necessary to imitate a web velocity of 10 m./sec. when the width of the cover is 20 cm. and the distance between the cover and the liquid surface is 1 mm. The velocity of the air flow over the solution must not be too high however, or the solution will exhibit inertial effects which would lead to errors in the temperature and moisture content values.

There are times when it is not suitable to heat the boundary layer of air before its passage past the hygrometer 45, particularly when small amounts of moisture are concerned. Then, it is often preferred to cool the air layer which is sucked from the web. For this, a cooling device can be mounted in the intake pipe 28 instead of or in addition to the heating device 51. If necessary, the cooling device and the heating device can be operated simultaneously, the cooling device being uncontrolled and the heating device being automatically regulated so that the desired constant temperature is maintained in the chamber 44.

Instead of keeping to a predetermined constant temperature in the chamber 44, it is possible instead to maintain a predetermined constant temperature differential between the temperature in the chamber 44 and the temperature of the web material. This can automatically take place if in the control circuit of FIG. 4 the resistance 100 is replaced by a thermometer which detects the temperature of the moving web 10 in the same way as the thermometer 70. It is also possible to let the temperature difference between the web 10 and the air in the chamber 44 become zero without putting the heating device 51 completely out of operation. Then, any drop in temperature which occurs can be automatically compensated on the way to the chamber 44.

In a slight modification of the unit illustrated in FIG. 3, the thermometer 70 can be mounted in its own pipe 61 in the inlet of the intake pipe 28.

A simplified embodiment of moisture and temperature measuring device according to the invention is partially shown in section in FIG. 8. This device similarly has a cover 11 which is of the same shape and design as in the first embodiment, but has no holes therethrough. A thermometer 70 and a hygrometer 45 are mounted at the underside of the cover 11 at those points where the pipes 28 and 61 are located in the first embodiment. The two measuring instruments 70 and 45 are thus actually located in the boundary-layer of air which passes between the cover 11 and the upper surface of the moving web 10. The measuring instruments can, as in the first embodiment, be connected into a bridge circuit as shown in FIG. 5, or can be connected to separate measuring circuits. In this second embodiment the minimum distance between the cover 11 and the moving web 10 is limited by the geometrical dimensions of the measuring instruments 70 and 45.

Finally, another embodiment may be used wherein the cover 11 is omitted altogether. In the unit 25, the pipe 61 together with the parts contained therein is either omitted or sealed. A hose or pipe-line is attached to the intake pipe 28 and the free end of the pipe-line is directed to the point where it is desired to draw off the air to be tested. In order to measure the actual temperature of the air, i.e. of the moving web, a thermometer is located at the free end of the hose or pipe-line. This thermometer performs the function of the thermometer 70 of the first embodiment. With this variation of the temperature and moisture measuring device, the free end of the hose or pipe-line can if necessary be moved to comparatively inaccessible places.

Although in the foregoing description reference has been made to a moving web of material the invention is not limited to the investigation of samples of this nature, but is generally applicable to the testing of any moving material, for example materials in powdered or particulate form.

What we claim is:

1. A method of determining the moisture content of a moving material by using at least one moisture sensing device which supplies an electrical output signal as a function of the value of the moisture being determined, which comprises mounting a cover of a non-hygroscopic, thermally insulating material in a fixed position spaced from the surface of the moving material and at least approximately parallel thereto, the linear surface measurements of the cover being each at least double the spacing of the cover from the surface of the material, causing the atmosphere passing between the cover and the surface of the material to be drawn off by an auxiliary device and moved past the sensing device so as to come into contact with the sensing device, and causing the atmosphere withdrawn from adjacently the moving material to be brought to a predetermined constant temperature before it comes into contact with the sensing device.

2. An apparatus for determining the moisture content of a moving material, comprising:
plate-like cover means of non-hygroscopic, thermally insulating material, said cover means having an aperture formed therein with said aperture being disposed in communication with the atmosphere between said cover means and said moving material;
means mounting said cover means in a fixed position spaced from the surface of said moving material;
wall means defining a chamber having an inlet orifice and an outlet orifice communicating therewith, the inlet orifice being in communication with said aperture;
a suction device connected to said outlet orifice for causing the atmosphere between said cover means and said moving material to be drawn through said aperture and said inlet orifice into said chamber;
a moisture sensing device arranged to supply an electrical output signal as a function of the value of the moisture being determined, said moisture sensing device being disposed within said chamber; and
a temperature varying device associated with the inlet orifice for permitting the temperature of the atmosphere to be changed prior to the atmosphere contacting the moisture sensing device.

3. An apparatus according to claim 2, further including a temperature sensing device disposed within said chamber for sensing the temperature of the atmosphere drawn into said chamber, and control means operatively connected between said temperature sensing device and said temperature varying device for automatically controlling said temperature varying device.

4. An apparatus according to claim 3, wherein said cover means has a second aperture formed therein in communication with the space between said cover means and said moving material, and wherein said wall means defines a second chamber having an inlet opening in communication with said second aperture and an outlet opening in communication with said suction device, and a second temperature sensing device associated with said second aperture for sensing the temperature of the atmosphere drawn through said second aperture.

5. An apparatus according to claim 4, wherein the two chambers and a common suction device therefor form an integral structural unit.

6. An apparatus according to claim 2, wherein the aperture in said cover means is located offset from the center of the cover along the path of movement of the material.

7. An apparatus according to claim 6, wherein the cover means is elongated and rectangular in shape and has its longitudinal axis substantially parallel to the direction of movement of the material, and wherein said aperture is equidistant from the trailing shorter length side of the cover means and from each of the longitudinal sides of the cover means.

8. An apparatus according to claim 4, wherein said control means includes an electrical bridge circuit and a regulating device connected to the differential output of said bridge circuit, and wherein said first-mentioned temperature sensing device and said second temperature sensing device are connected in oppositely acting arms of said electrical bridge circuit, whereby said regulating device controls said temperature varying device.

9. An apparatus according to claim 2, further including filter means associated with said inlet orifice for filtering the atmosphere flowing into said chamber, said filter means being non-hygroscopic and thermally neutral.

10. An apparatus according to claim 9, wherein said filter means is capable of absorbing chemically harmful substances.

11. An apparatus for determining the moisture content of a moving material, comprising:
plate-like cover means of non-hygroscopic, thermally insulating material, said cover means being disposed adjacent said moving material and having an aperture formed therein in communication with the atmosphere located in the space between said cover means and said moving material;
means for mounting said cover means in a fixed position spaced from the surface of the moving material;
wall means defining a chamber having an inlet orifice and an outlet orifice, the inlet orifice being in communication with said aperture;
a suction device in communication with said outlet orifice for drawing the atmosphere from the space between said cover means and said moving material through said aperture and said inlet orifice into said chamber;
measuring means arranged to supply an electrical output signal as a function of the value of the parameter being determined, said measuring means including a moisture sensing device disposed within said chamber for sensing the moisture content of said atmosphere, said measuring means also including a temperature sensing device disposed for sensing the temperature of said atmosphere;
said measuring means including an electrical bridge circuit with said moisture sensing device and said temperature sensing device being connected in the oppositely acting arms of said electrical bridge circuit; and
means for indicating the moisture content of the material sensed by said moisture sensing device, said indicating means being connected to the differential output of said bridge circuit.

12. An apparatus according to claim 11, wherein each arm of the bridge circuit also includes two ohmic resistance means, one being connected in parallel with the respective sensing device and the other connected in series with the parallel-connected pair.

13. A method of determining the moisture content of a moving material by using at least one moisture sensing device which supplies an electrical output signal as a function of the value of the moisture being determined, which comprises mounting a cover of a non-hygroscopic, thermally insulating material in a fixed position spaced from the surface of the moving material and at least approximately parallel thereto, the linear surface measurements of the cover being each at least double the spacing of the cover from the surface of the material, causing the atmosphere passing between the cover and the surface of the material to be drawn off by an auxiliary device and moved past the sensing device so as to come into contact with the sensing device, and causing the temperature of the atmosphere withdrawn from adjacent the moving material to be varied before it comes into contact with the sensing device.

14. A method according to claim 13, wherein the atmosphere withdrawn from adjacent the moving material is heated before it comes into contact with the sensing device.

15. A method according to claim 13, wherein the atmosphere withdrawn from adjacent the moving material is brought to a temperature which differs from the temperature of the material by a predetermined amount before coming into contact with the moisture sensing device.

16. A method according to claim 13, wherein the temperature of the atmosphere withdrawn from adjacent the moving material is restored to the temperature of the moving material before coming into contact with the moisture sensing device.

References Cited

UNITED STATES PATENTS

| | | | |
|---|---|---|---|
| 2,627,182 | 2/1953 | Quereau | 73—351 |
| 3,077,770 | 2/1963 | Burk | 73—73 |

FOREIGN PATENTS

| | | | |
|---|---|---|---|
| 830,077 | 3/1960 | Great Britain | 73—73 |

LOUIS R. PRINCE, Primary Examiner

D. E. CORR, Assistant Examiner

U.S. Cl. X.R.

73—159